US012002419B2

(12) United States Patent
Kim

(10) Patent No.: US 12,002,419 B2
(45) Date of Patent: Jun. 4, 2024

(54) PIXEL STRUCTURE OF ORGANIC LIGHT EMITTING DIODE DISPLAY DEVICE FOR IMPROVING IMAGE QUALITY DURING LOW FREQUENCY DRIVING

(71) Applicant: Samsung Display Co., Ltd., Yongin-Si (KR)

(72) Inventor: Keunwoo Kim, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 28 days.

(21) Appl. No.: 17/521,207

(22) Filed: Nov. 8, 2021

(65) Prior Publication Data

US 2022/0238070 A1 Jul. 28, 2022

(30) Foreign Application Priority Data

Jan. 27, 2021 (KR) ........................ 10-2021-0011526

(51) Int. Cl.
*G09G 3/3208* (2016.01)

(52) U.S. Cl.
CPC ... *G09G 3/3208* (2013.01); *G09G 2300/0809* (2013.01); *G09G 2310/08* (2013.01); *G09G 2320/0214* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,934,751 B2 | 4/2018 | Kim | | |
| 11,282,460 B2 * | 3/2022 | Teraguchi | ............ | H10K 59/123 |
| 11,410,607 B2 * | 8/2022 | Roh | ..................... | G09G 3/3266 |
| 2012/0327058 A1 * | 12/2012 | Minami | ............... | G09G 3/3208 345/55 |

(Continued)

FOREIGN PATENT DOCUMENTS

| | | |
|---|---|---|
| KR | 1020160044078 A | 4/2016 |
| KR | 1020190078750 A | 7/2019 |

(Continued)

OTHER PUBLICATIONS

1 Extended European Search Report for Application No. 22153778.0-1210 dated Mar. 15, 2022.

*Primary Examiner* — Benjamin C Lee
*Assistant Examiner* — Emily J Frank
(74) *Attorney, Agent, or Firm* — CANTOR COLBURN LLP

(57) ABSTRACT

A pixel includes a first capacitor including a first electrode connected to a wire of a first power supply voltage, and a second electrode connected to a gate node, a first transistor including a gate electrode connected to the gate node, and a back gate electrode connected to a back gate line, a second transistor which transmits a data signal to a source of the first transistor in response to a first gate signal, a third transistor which diode-connects the first transistor in response to the first gate signal, a fourth transistor which transmits an initialization voltage to the gate node in response to a second gate signal. The first transistor receives a back gate voltage, which is obtained by delaying the first gate signal by a ½ frame, through the back gate electrode in a low-frequency driving mode.

19 Claims, 9 Drawing Sheets

(56) References Cited

U.S. PATENT DOCUMENTS

| | | | | |
|---|---|---|---|---|
| 2017/0270882 | A1* | 9/2017 | Mori | G06F 3/0412 |
| 2017/0365203 | A1* | 12/2017 | Takahashi | G09G 3/3607 |
| 2018/0069069 | A1* | 3/2018 | Ebisuno | H01L 27/3265 |
| 2020/0342814 | A1* | 10/2020 | Teraguchi | G09G 3/3258 |
| 2022/0093027 | A1* | 3/2022 | Hong | G11C 19/28 |

FOREIGN PATENT DOCUMENTS

| | | | |
|---|---|---|---|
| KR | 1020200093113 | A | 8/2020 |
| KR | 1020200115767 | A | 10/2020 |

* cited by examiner

PIXEL STRUCTURE OF ORGANIC LIGHT EMITTING DIODE DISPLAY DEVICE FOR IMPROVING IMAGE QUALITY DURING LOW FREQUENCY DRIVING

This application claims priority to Korean Patent Application No. 10-2021-0011526, filed on Jan. 27, 2021, and all the benefits accruing therefrom under 35 USC § 119, the content of which in its entirety is herein incorporated by reference.

BACKGROUND

1. Field

Embodiments of the invention relate to a display device. More particularly, Embodiments of the invention relate to a pixel of an organic light emitting diode display device, and an organic light emitting diode display device.

2. Description of the Related Art

Organic light emitting diode display devices used in portable terminals such as smartphones and tablet computers are desired to have reduced power consumption. Recently, a low-frequency driving technology for reducing a driving frequency when the organic light emitting diode display device displays a still image has been developed to reduce the power consumption of the organic light emitting diode display device.

SUMMARY

In an organic light emitting diode display device using a low-frequency driving technology, while a display panel displays an image based on a stored data signals, the stored data signals may be distorted by leakage currents of transistors included in pixels of the display panel, and image quality of the organic light emitting diode display device may be deteriorated.

Embodiments of the invention provide a pixel of an organic light emitting diode display device, configured to prevent or reduce deterioration of image quality during low-frequency driving.

Embodiments of the invention also provide an organic light emitting diode display device configured to prevent or reduce deterioration of image quality during low-frequency driving.

In an embodiment of a pixel of an organic light emitting diode display device according to the invention, the pixel of the organic light emitting diode display device includes a first capacitor including a first electrode connected to a wire of a first power supply voltage, and a second electrode connected to a gate node, a first transistor including a gate electrode connected to the gate node, and a back gate electrode connected to a back gate line, a second transistor which transmits a data signal to a source of the first transistor in response to a first gate signal, a third transistor which diode-connects the first transistor in response to the first gate signal, a fourth transistor which transmits an initialization voltage to the gate node in response to a second gate signal, and a light emitting diode including an anode, and a cathode connected to a wire of a second power supply voltage. In such an embodiment, the first transistor receives a back gate voltage, which is obtained by delaying the first gate signal by a ½ frame, through the back gate electrode in a low-frequency driving mode.

In an embodiment, the back gate electrode may be disposed under the gate electrode of the first transistor.

In an embodiment, a swing width of the back gate voltage may be adjustable.

In an embodiment, the third transistor may include first and second sub-transistors connected to each other in series between the gate node and a drain of the first transistor.

In an embodiment, the fourth transistor may include third and fourth sub-transistors connected to each other in series between the gate node and a wire of the initialization voltage.

In an embodiment, the pixel of the organic light emitting diode display device may further include a fifth transistor including a gate electrode which receives an emission signal, a source connected to the wire of the first power supply voltage, and a drain connected to the source of the first transistor, a sixth transistor including a gate electrode which receive the emission signal, a source connected to a drain of the first transistor, and a drain connected to the anode of the organic light emitting diode, and a seventh transistor including a gate electrode which receives a third gate signal, a source connected to the anode of the organic light emitting diode, and a drain connected to a wire of the initialization voltage.

In an embodiment of a pixel of an organic light emitting diode display device according to the invention, the pixel of the organic light emitting diode display device includes a first capacitor including a first electrode connected to a wire of a first power supply voltage, and a second electrode connected to a gate node, a first transistor including a gate electrode connected to the gate node, and a back gate electrode connected to a back gate line, a second transistor which transmits a data signal to a source of the first transistor in response to a first gate signal, a third transistor which diode-connects the first transistor in response to the first gate signal, a fourth transistor which transmits an initialization voltage to the gate node in response to a second gate signal, and a light emitting diode including an anode, and a cathode connected to a wire of a second power supply voltage. In such an embodiment, the first transistor receives a back gate voltage through the back gate electrode, and the back gate voltage is controlled in a way such that a frequency of the back gate voltage is increased as a frequency of the first gate signal decreases in an ultra-low-frequency driving mode.

In an embodiment, the back gate electrode may be disposed under the gate electrode of the first transistor.

In an embodiment, a swing width of the back gate voltage may be adjustable.

In an embodiment, the third transistor may include first and second sub-transistors connected to each other in series between the gate node and a drain of the first transistor.

In an embodiment, the fourth transistor may include third and fourth sub-transistors connected to each other in series between the gate node and a wire of the initialization voltage.

In an embodiment, the pixel of the organic light emitting diode display device may further include a fifth transistor including a gate electrode which receives an emission signal, a source connected to the wire of the first power supply voltage, and a drain connected to the source of the first transistor, a sixth transistor including a gate electrode which receives the emission signal, a source connected to a drain of the first transistor, and a drain connected to the anode of the organic light emitting diode, and a seventh transistor including a gate electrode which receives a third gate signal, a source connected to the anode of the organic light emitting diode, and a drain connected to a wire of the initialization voltage.

In an embodiment of an organic light emitting diode display device according to the invention, the organic light emitting diode display device includes a display panel including a plurality of pixels, a data driver which provides a data signal to the pixels, a gate driver which provides a gate signal to the pixels, a back gate driver which provides a back gate voltage to the pixels, and a driving controller which controls the data driver, the gate driver, and the back gate driver. Each of the pixels may include a first capacitor including a first electrode connected to a wire of a first power supply voltage, and a second electrode connected to a gate node, a first transistor including a gate electrode connected to the gate node, and a back gate electrode connected to a back gate line, a second transistor which transmits a data signal to a source of the first transistor in response to a first gate signal, a third transistor which diode-connects the first transistor in response to the first gate signal, a fourth transistor which transmits an initialization voltage to the gate node in response to a second gate signal, and a light emitting diode including an anode, and a cathode connected to a wire of a second power supply voltage. In such an embodiment, the first transistor receives a back gate voltage through the back gate electrode, and the back gate electrode is disposed under the gate electrode of the first transistor.

In an embodiment, the back gate voltage may be obtained by delaying the first gate signal by a ½ frame in a low-frequency driving mode.

In an embodiment, the back gate driver may include a back gate voltage controller which adjust a swing width of the back gate voltage.

In an embodiment, the back gate voltage controller may include a backward diode including a gate electrode which receives the back gate voltage and a source to which the first power supply voltage is applied, and a forward diode connected to the back gate line.

In an embodiment, the third transistor may include first and second sub-transistors connected to each other in series between the gate node and a drain of the first transistor.

In an embodiment, the fourth transistor may include third and fourth sub-transistors connected to each other in series between the gate node and a wire of the initialization voltage.

In an embodiment, each of the pixels may further include a fifth transistor including a gate electrode which receives an emission signal, a source connected to the wire of the first power supply voltage, and a drain connected to the source of the first transistor, a sixth transistor including a gate electrode which receives the emission signal, a source connected to a drain of the first transistor, and a drain connected to the anode of the organic light emitting diode, and a seventh transistor including a gate electrode which receives a third gate signal, a source connected to the anode of the organic light emitting diode, and a drain connected to a wire of the initialization voltage.

In an embodiment, the back gate voltage may be controlled in a way such that a frequency of the back gate voltage is increased as a frequency of the first gate signal decreases in an ultra-low-frequency driving mode.

According to embodiments of the invention, the pixel of the organic light emitting diode display device may receive the back gate voltage through the back gate electrode of the first transistor during the low-frequency driving, and may control a variation of a gate voltage based on the back gate voltage. Accordingly, distortion of a voltage of the gate node during the low-frequency driving may be compensated, and display quality of the organic light emitting diode display device may be improved.

DETAILED DESCRIPTION

Figure 1:
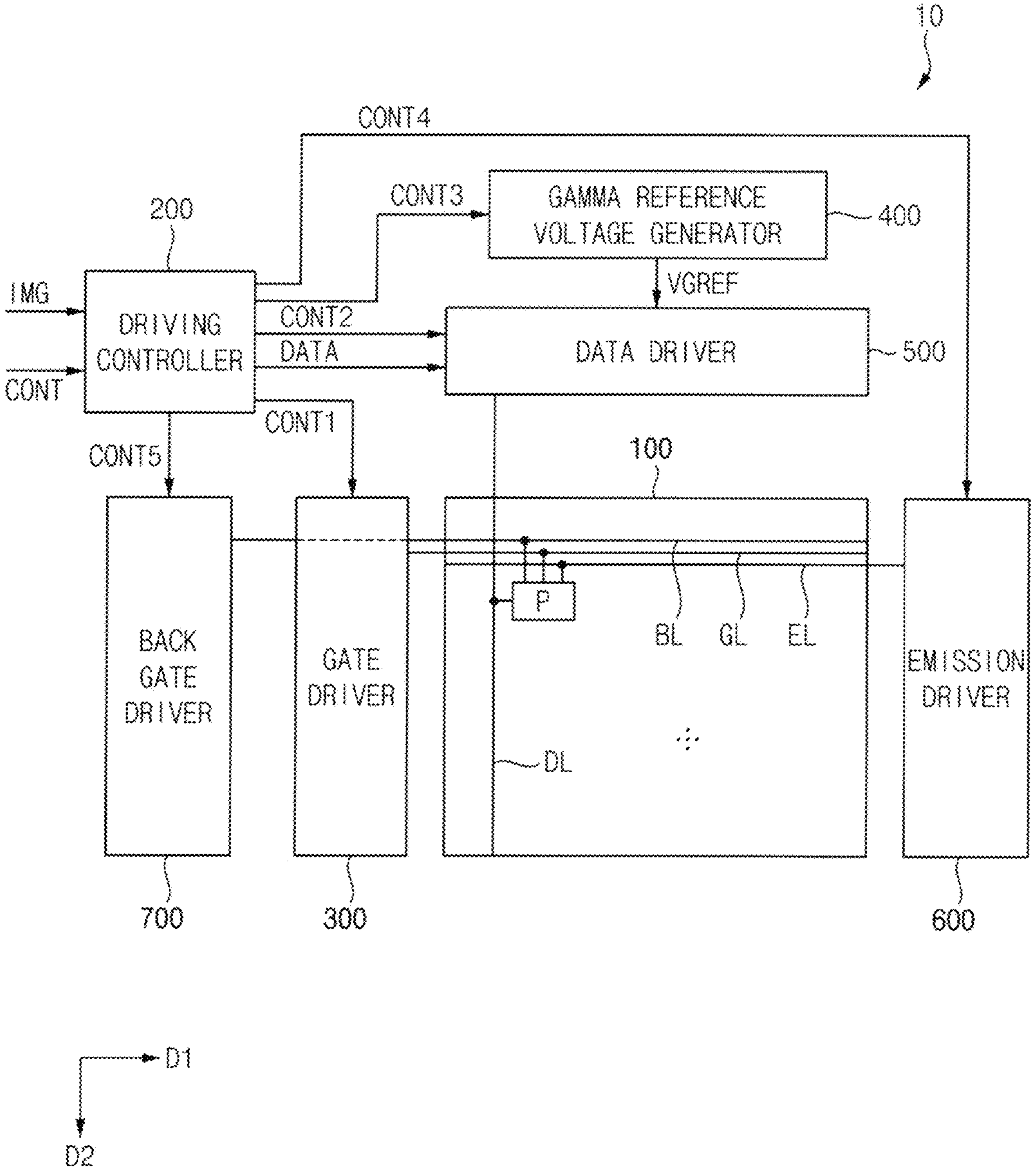
FIG. 1 is a block diagram illustrating an organic light emitting diode display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device according to an embodiment of the invention.

Referring to FIG. 1, an embodiment of a display device 10 may include a display panel 100 and a display panel driver. The display panel driver may include a driving controller 200, a gate driver 300, a gamma reference voltage generator 400, a data driver 500, an emission driver 600, and a back gate driver 700.

The display panel 100 may include a display area for displaying an image, and a peripheral area adjacent to the display area.

The display panel 100 may include a plurality of gate lines GL, a plurality of data lines DL, a plurality of emission lines EL, a plurality of back gate lines BL, and a plurality of pixels P electrically connected to the gate lines GL, the data lines DL, the emission lines EL, and the back gate lines BL. The gate lines GL may extend in a first direction D1, the data lines DL may extend in a second direction D2 intersecting the first direction D1, the emission lines EL may extend in the first direction D1, and the back gate lines BL may extend in the first direction D1.

The driving controller 200 may receive input image data IMG and an input control signal CONT from an external device (not shown). In one embodiment, for example, the input image data IMG may include red image data, green image data, and blue image data. The input image data IMG may further include white image data. In an alternative embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In one embodiment, for example, the gamma reference voltage generator 400 may be disposed in the driving controller 200 or the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into an analog data signal DATA by using the gamma reference voltage VGREF. The data driver 500 may output the data signal DATA in an analog form to the data line DL.

The emission driver 600 may generate emission signals for driving the emission lines EL in response to the fourth control signal CONT4 received from the driving controller 200. The emission driver 600 may output the emission signals to the emission lines EL.

The back gate driver 700 may generate back gate voltages VBML for driving the back gate lines BL in response to the fifth control signal CONT5 received from the driving controller 200. The back gate driver 700 may output the back gate voltages VBML to the back gate lines BL.

Figure 2:
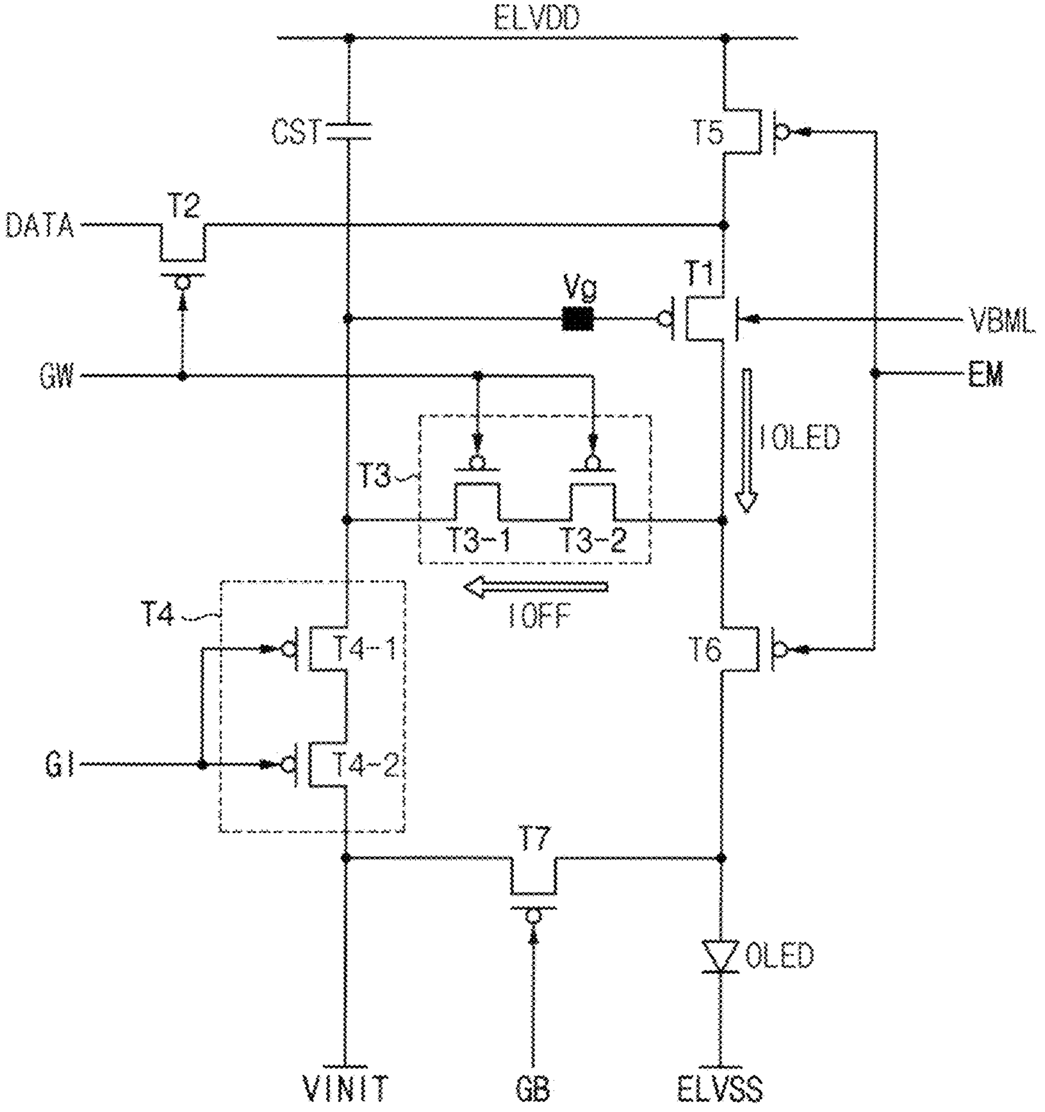
FIG. 2 is a circuit diagram illustrating an embodiment of a pixel of the organic light emitting diode display device of FIG. 1.
Figure 3:
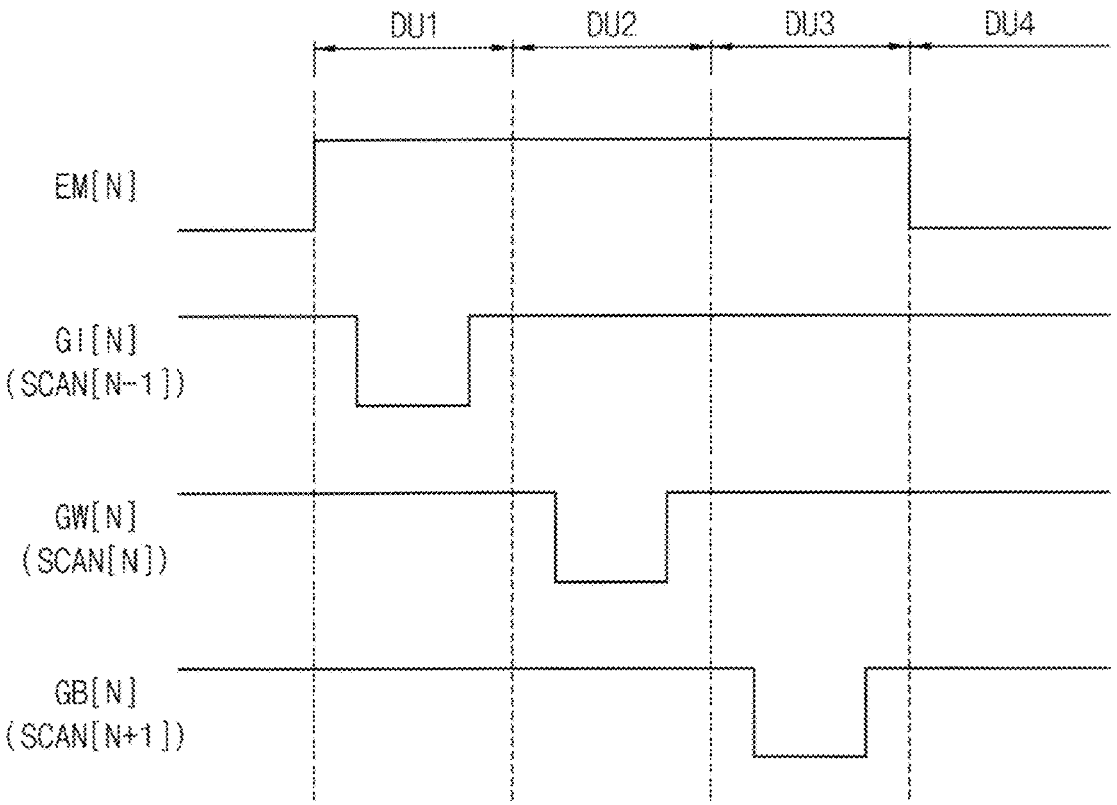
FIG. 3 is a timing diagram illustrating input signals applied to the pixel of FIG. 2.
Figure 4:
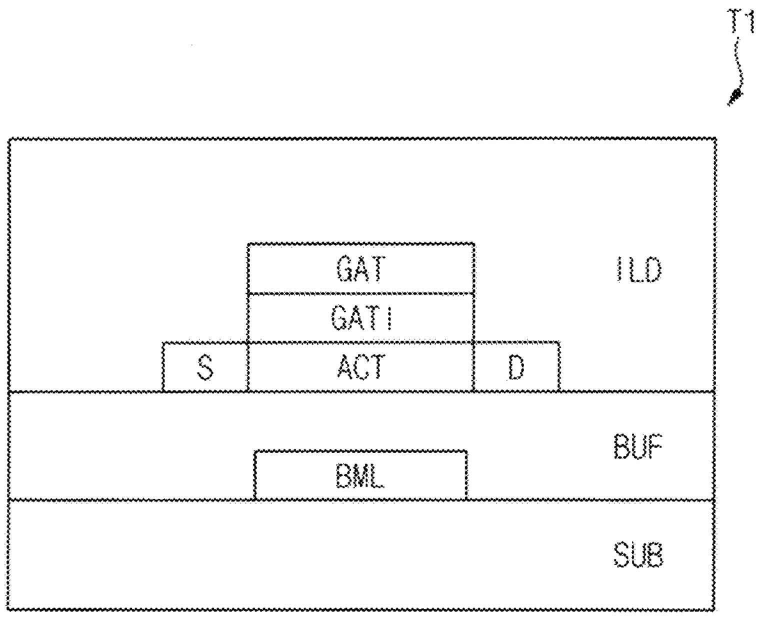
FIG. 4 is a schematic sectional view illustrating an embodiment of a first transistor included in the pixel of FIG. 2.

FIG. 2 is a circuit diagram illustrating an embodiment of a pixel of a display panel of FIG. 1, FIG. 3 is a timing diagram illustrating input signals applied to the pixel of FIG. 2, and FIG. 4 is a schematic sectional view illustrating an embodiment of a first transistor T1 included in the pixel of FIG. 2.

Referring to FIGS. 1 to 4, an embodiment of the display panel 100 may include a plurality of pixels P, and each of the pixels P may include an organic light emitting diode OLED. According to an embodiment of the invention, the pixel P may include a first capacitor CST, a first transistor T1, a second transistor T2, a third transistor T3, a fourth transistor T4, and an organic light emitting diode OLED. In such an embodiment, the pixel P may further include a fifth transistor T5, a sixth transistor T6, and a seventh transistor T7.

The first capacitor CST may store the data signal DATA transmitted through the second transistor T2 and the first transistor T1 that is diode-connected. In an embodiment, the first capacitor CST may include a first electrode connected to a wire of a first power supply voltage ELVDD, and a second electrode connected to a gate node. Here, the gate node is a node connected to the first transistor, the first capacitor CST and the third transistor T3.

The first transistor T1 may generate a driving current (IOLED in FIG. 2) based on the data signal DATA stored in the first capacitor CST, that is, a voltage of the gate node. The first transistor T1 may be referred to as a driving transistor. In an embodiment, the first transistor T1 may include a gate electrode connected to the second electrode of the first capacitor CST, that is, the gate node, a source connected to the wire of the first power supply voltage ELVDD, and a drain connected to a source of the sixth transistor T6. The first transistor T1 may include a back gate electrode BML connected to the back gate line BL. The first transistor T1 may receive the back gate voltage VBML through the back gate electrode BML.

The second transistor T2 may transmit the data signal DATA to the source of the first transistor T1 in response to a first gate signal GW. The second transistor T2 may be referred to as a switching transistor or a scan transistor. In an embodiment, the second transistor T2 may include a gate electrode which receives the first gate signal GW, a source which receives the data signal DATA, and a drain connected to the source of the first transistor T1.

The third transistor T3 may diode-connect the first transistor T1 (i.e., connect the first transistor T1 in a diode configuration) in response to the first gate signal GW. The third transistor T3 may be referred to as a threshold voltage compensation transistor. In an embodiment, the third transistor T3 may include a gate electrode which receives the first gate signal GW, a drain (or a second drain of a second sub-transistor T3-2) connected to the drain of the first transistor T1, and a source (or a first source of a first sub-transistor T3-1) connected to the gate electrode of the first transistor T1, that is, the gate node. While the first gate signal GW is applied, the data signal DATA transmitted by the second transistor T2 may pass through the first transistor T1 that is diode-connected by the third transistor T3 to be stored in the first capacitor CST. Accordingly, the data signal DATA obtained by compensating for a threshold voltage of the first transistor T1 may be stored in the first capacitor CST.

The fourth transistor T4 may transmit an initialization voltage VINIT to the gate node in response to a second gate signal GI. The fourth transistor T4 may be referred to as a gate initialization transistor. In an embodiment, the fourth transistor T4 may include a gate electrode which receive the second gate signal GI, a source (or a first source of a third sub-transistor T4-1) connected to the source of the third transistor T3, that is, the gate node, and a drain (or a second drain of a fourth sub-transistor T4-2) connected to a wire of the initialization voltage VINIT. While the second gate signal GI is applied, the fourth transistor T4 may initialize the gate node, that is, the first capacitor CST and the gate electrode of the first transistor T1, by using the initialization voltage VINIT.

The fifth transistor T5 may connect the wire of the first power supply voltage ELVDD to the source of the first transistor T1 in response to an emission signal EM. The fifth transistor T5 may be referred to as a first light emitting transistor. In an embodiment, the fifth transistor T5 may include a gate electrode which receives the emission signal EM, a source connected to the wire of the first power supply voltage ELVDD, and a drain connected to the source of the first transistor T1.

The sixth transistor T6 may connect the drain of the first transistor T1 to an anode of the organic light emitting diode OLED in response to the emission signal EM. The sixth transistor T6 may be referred to as a second light emitting transistor. In an embodiment, the sixth transistor T6 may include a gate electrode which receives the emission signal EM, a source connected to the drain of the first transistor T1, and a drain connected to the anode of the organic light emitting diode OLED. While the emission signal EM is applied, the fifth and sixth transistors T5 and T6 may be turned on, and a path of the driving current from the wire of the first power supply voltage ELVDD to a wire of a second power supply voltage ELVSS may be formed.

The seventh transistor T7 may transmit the initialization voltage VINIT to the anode of the organic light emitting diode OLED in response to a third gate signal GB. The seventh transistor T7 may be referred to as a diode initialization transistor. In an embodiment, the seventh transistor T7 may include a gate electrode which receives the third gate signal GB, a source connected to the anode of an organic light emitting diode OLED, and a drain connected to the wire of the initialization voltage VINIT. While the third gate signal GB is applied, the seventh transistor T7 may initialize the organic light emitting diode OLED by using the initialization voltage VINIT.

The organic light emitting diode OLED may emit light based on the driving current generated by the first transistor T1. In an embodiment, the organic light emitting diode OLED may include an anode connected to the drain of the sixth transistor T6, and a cathode connected to the wire of the second power supply voltage ELVSS. While the emission signal EM is applied, the driving current generated by the first transistor T1 may be provided to the organic light emitting diode OLED, and the organic light emitting diode OLED may emit the light based on the driving current.

In an embodiment, as shown in FIG. 3, an N-th frame period of the pixel P may include a first period DU1 in which the gate electrode of the first transistor T1 is initialized, a second period DU2 in which the data signal DATA obtained by compensating for the threshold voltage is written, a third period DU3 in which the anode of the organic light emitting diode OLED is initialized, and a fourth period DU4 in which the organic light emitting diode OLED emits the light. The pixels P may receive an N-th first gate signal GW[N], an N-th second gate signal GI[N], an N-th third gate signal GB[N], the data signal DATA, and an N-th emission signal EM[N], and emit light from the organic light emitting diode OLED with a luminance corresponding to a level of the data signal DATA to display an image. Here, N is a natural number. In one embodiment, for example, the N-th first gate signal GW[N] may be a scan signal SCAN[N] of a current frame period, i.e., an N-th frame period, the N-th second gate signal GI[N] may be a scan signal SCAN[N−1] of a previous frame period, i.e., an (N−1)-th frame period, and the N-th third gate signal GB[N] may be a scan signal SCAN[N+1] of a next frame period, i.e., an (N+1)-th frame period. In such an embodiment, during the first period DU1, the fourth transistor T4 may be turned on, and the initialization voltage VINIT may be applied to the gate node, such that the gate electrode of the first transistor T1 may be initialized. During the second period DU2, the second transistor T2 and the third transistor T3 may be turned on. As the second transistor T2 is turned on, the data signal DATA may be supplied to the gate node, and as the third transistor T3 is turned on, the first transistor T1 may be diode-connected. Therefore, the data signal DATA obtained by compensating for the threshold voltage of the first transistor T1 may be stored in the first capacitor CST. During the third period DU3, the seventh transistor T7 may be turned on, and the initialization voltage VINIT may be applied to the anode of the organic light emitting diode OLED, such that the anode of the organic light emitting diode OLED may be initialized. During the fourth period DU4, the fifth transistor T5 and the sixth transistor T6 may be turned on, such that the driving current generated by the first transistor T1 may flow to the organic light emitting diode OLED.

The organic light emitting diode display device including the pixel P may perform low-frequency driving to reduce power consumption. During the low-frequency driving, in at least a part of a plurality of frame periods, each of the pixels P may emit light based on the data signal DATA stored in the first capacitor CST during the previous frame period without receiving the second gate signal GI[N], the first gate signal GW[N], and the data signal DATA. In this case, the data signal DATA stored in the first capacitor CST, that is, the voltage of the gate node, may be distorted by leakage currents of the transistors T1 to T7 of the pixel P, e.g., the leakage currents of the third and fourth transistors T3 and T4, and image quality of the organic light emitting diode display device may be deteriorated.

In an embodiment, each of the third and fourth transistors T3 and T4 may have a dual transistor structure to reduce such leakage currents of the third and fourth transistors T3 and T4. In one embodiment, for example, as shown in FIG. 2, the third transistor T3 may include first and second sub-transistors T3-1 and T3-2 connected to each other in series between the gate node and the drain of the first transistor T1, and the fourth transistor T4 may include third and fourth sub-transistors T4-1 and T4-2 connected to each other in series between the gate node and the wire of the initialization voltage VINIT. In such an embodiment where the third transistor T3 includes the first and second sub-transistors T3-1 and T3-2, the leakage current of the third transistor T3 from the drain of the first transistor T1 to the gate node may be reduced. In such an embodiment, where the fourth transistor T4 includes the third and fourth sub-transistors T4-1 and T4-2, the leakage current of the fourth transistor T4 from the wire of the initialization voltage VINIT to the gate node may be reduced.

However, even when the third transistor T3 includes the first and second sub-transistors T3-1 and T3-2 having the dual transistor structure, a parasitic capacitor may be formed between a node between the first and second sub-transistors T3-1 and T3-2 and a wire of the pixel P (e.g., a wire of the first gate signal GW), and a leakage current of the first sub-transistor T3-1 from the node between the first and second sub-transistors T3-1 and T3-2 to the gate node may be generated. In addition, even when the fourth transistor T4 includes the third and fourth sub-transistors T4-1 and T4-2 having the dual transistor structure, a parasitic capacitor may be formed between a node between the third and fourth sub-transistors T4-1 and T4-2 and a wire of the pixel P (e.g., a wire of the second gate signal GI), and a leakage current of the third sub-transistor T4-1 from the node between the third and fourth sub-transistors T4-1 and T4-2 to the gate node may be generated. Accordingly, the voltage of the gate node may be increased, the driving current of the driving transistor T1 may be decreased, and a luminance of the organic light emitting diode OLED may be decreased.

In an embodiment of the pixel P of the organic light emitting diode display device according to the invention, the first transistor T1 may include a back gate electrode BML under the gate electrode to compensate for such distortion of the voltage of the gate node caused by the leakage currents of the first sub-transistor T3-1 and the third sub-transistor T4-1. In an embodiment, the back gate electrode BML may be referred to as a bottom metal layer.

In an embodiment, as shown in FIG. 2, the first transistor T1 may include a gate electrode connected to the second electrode of the first capacitor CST, that is, the gate node, a source connected to the wire of the first power supply voltage ELVDD, a drain connected to the source of the sixth transistor T6, and a back gate electrode BML disposed under the gate electrode.

In one embodiment, for example, as shown in FIG. 4, the back gate electrode BML may be disposed or formed on a substrate SUB such as an organic substrate or a polyimide ("PI") substrate to overlap the gate electrode. In one embodiment, for example, the back gate electrode BML may include molybdenum (Mo), but is not limited thereto. In an alternative embodiment, the back gate electrode BML may include a low-resistance opaque conductive material such as aluminum (Al), an aluminum alloy (Al alloy), tungsten (W), copper (Cu), nickel (Ni), chromium (Cr), titanium (Ti), platinum (Pt), and tantalum (Ta). A buffer layer BUF for preventing impurities in the substrate SUB may be disposed or formed on the back gate electrode BML. A source S, an active region ACT, and a drain D of the first transistor T1 may be disposed or formed on the buffer layer BUF. A gate insulating layer GATI may be disposed or formed on the active region ACT. A gate electrode GAT may be disposed or formed on the gate insulating layer GATI. The gate electrode GAT may overlap the back gate electrode BML. An interlayer insulating layer ILD may be disposed or formed on the buffer layer BUF.

In an embodiment of the pixel P of the organic light emitting diode display device of according to the invention, in a low-frequency driving mode, the back gate electrode BML of the first transistor T1 may receive the back gate voltage VBML through the back gate line BL, and control a variation of the gate voltage based on the back gate voltage VBML. When the variation of the gate voltage decreases, a flicker phenomenon caused by a decrease in a variation of a driving current IOLED flowing through the first transistor T1 may be effectively prevented. Hereinafter, operations of the first transistor T1 according to embodiments of the invention will be described in greater detail with reference to FIGS. 5 to 9.

Figure 5:
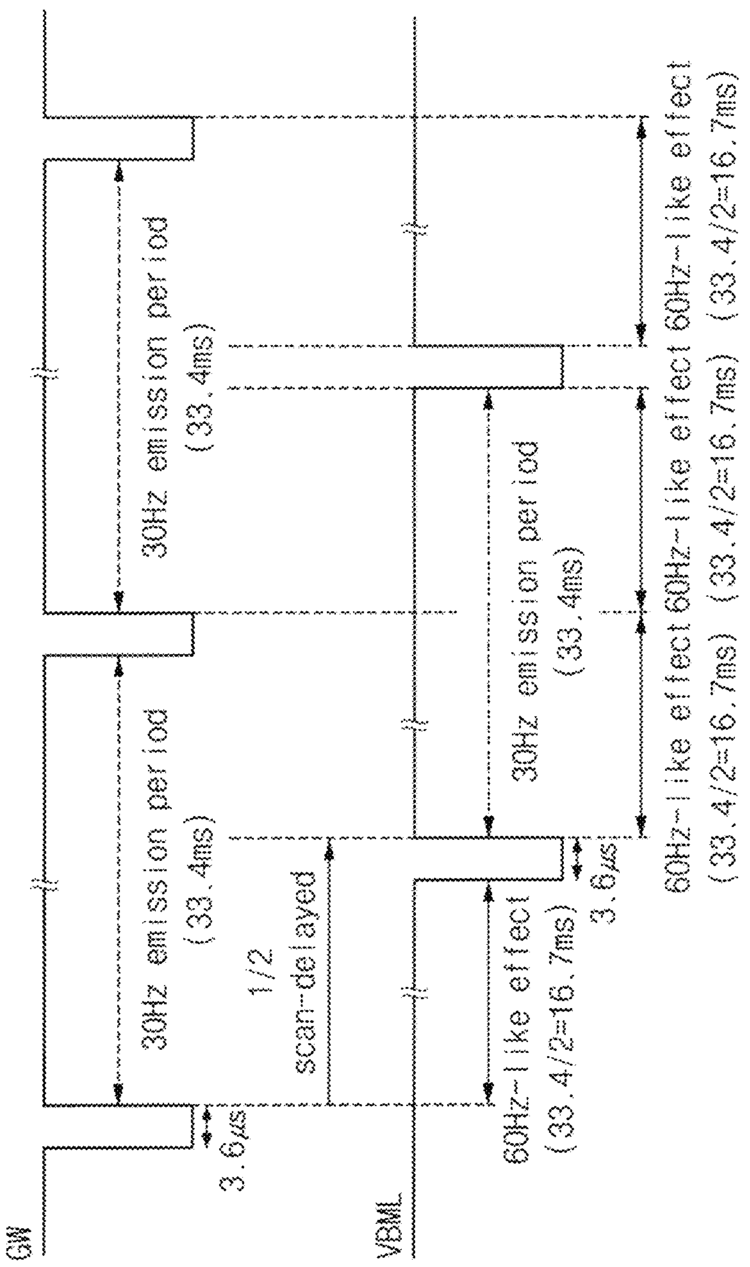
FIG. 5 is a timing diagram illustrating an embodiment of a back gate voltage applied to the pixel of FIG. 2.
Figure 6:
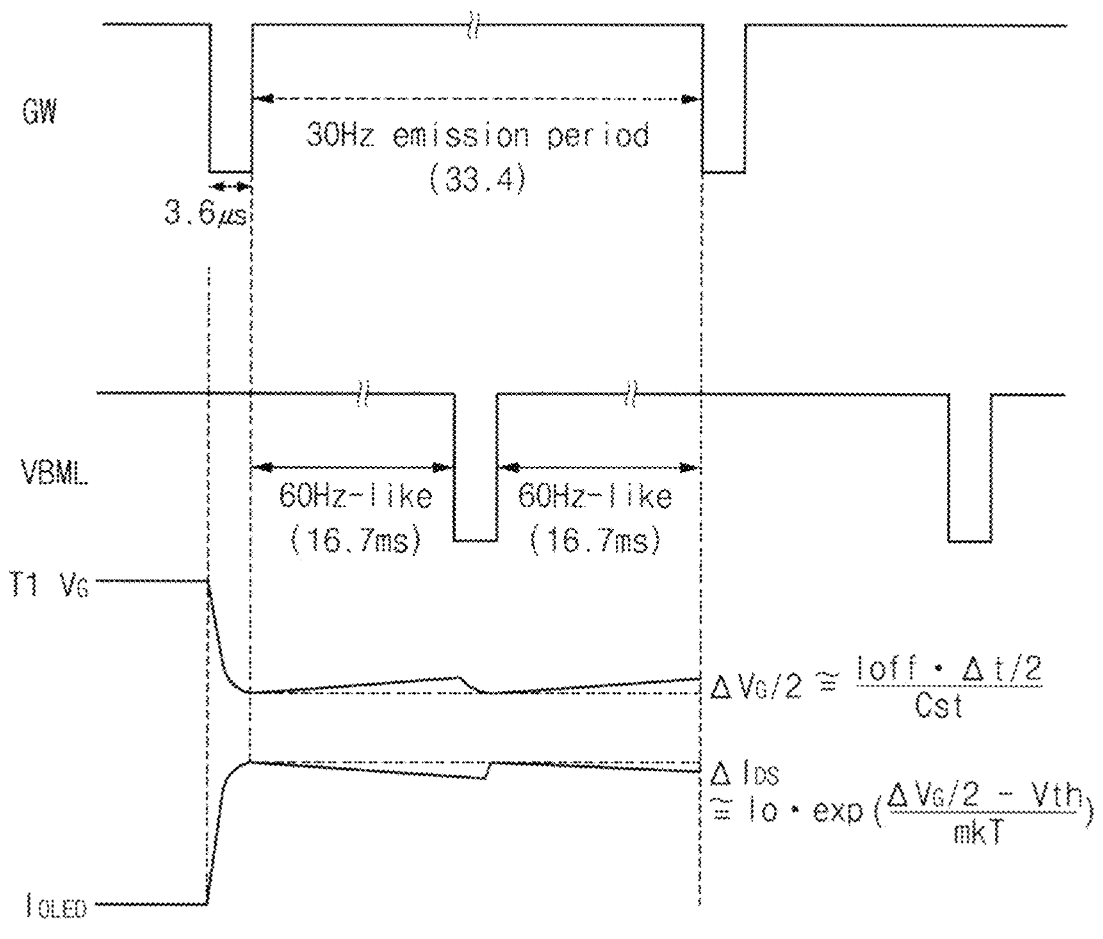
FIG. 6 is a timing diagram illustrating variations of a voltage and a current inside the pixel when the back gate voltage of FIG. 5 is applied.

FIG. 5 is a timing diagram illustrating an embodiment of a back gate voltage VBML applied to the pixel of FIG. 2, and FIG. 6 is a timing diagram illustrating variations of a voltage and a current inside the pixel when the back gate voltage VBML of FIG. 5 is applied.

Referring to FIGS. 5 and 6, an embodiment of the pixel of the organic light emitting diode display device according to the invention may include the first transistor T1 including the gate electrode connected to the gate node and the back gate electrode BML connected to the back gate line BL, as shown in FIG. 2. In an embodiment, during the low-frequency driving, the first transistor T1 may include the back gate electrode BML under the gate electrode to compensate for the distortion of the voltage of the gate node caused by the leakage currents of the first sub-transistor T3-1 and the third sub-transistor T4-1. In such an embodiment, in the low-frequency driving mode, the first transistor T1 may receive the back gate voltage VBML, which is obtained by delaying the first gate signal GW by a ½ frame, through the back gate electrode BML.

In an embodiment, the organic light emitting diode display device may operate in the low-frequency driving mode. The low-frequency driving mode may be a mode in which a driving signal of the organic light emitting diode display device is driven at a frequency of 30 hertz (Hz) or less. In one embodiment, for example, the first gate signal GW and the back gate voltage VBML may be driven at 30 Hz as shown in FIG. 5, but a frequency of the low-frequency driving mode is not limited thereto. When the back gate voltage VBML is obtained by delaying the first gate signal GW by the ½ frame, the back gate voltage VBML may be applied to the back gate electrode BML of the first transistor T1 at a middle point of an emission period of the pixel of the organic light emitting diode display device. In one embodiment, for example, when a time of the emission period of the organic light emitting diode display device is 33.4 milliseconds (ms), the back gate voltage VBML may be applied to the back gate electrode BML of the first transistor T1 at a time point elapsed by 16.7 ms from the start of the emission period.

In an embodiment, the variation of the gate voltage applied to the first transistor T1 may be calculated by Formula:

$$\Delta V_g \cong \frac{I_{off} \times \Delta t}{C_{st}}.$$

In the Formula, $I_{off}$ may denote an off-current flowing through T3 and T4 (IOFF in FIG. 2). In addition, a variation of the driving current IOLED flowing through the first transistor T1 may be calculated by Formula:

$$\Delta I_{DS} \cong I_O \cdot \exp\left(\frac{\Delta V_g - V_{th}}{mKT}\right).$$

In the Formula, $I_o$ may denote a reference off-current according to a characteristic of the pixel. In addition, $V_{th}$ may denote the threshold voltage of the first transistor. Further, m may denote a proportionality constant representing a characteristic of the first transistor, K may denote a Boltzmann constant, and T may denote a temperature proportionality constant. In the Formula, the variation of the gate voltage applied to the first transistor T1 may be reduced by the back gate voltage VBML. Accordingly, in an embodiment, where the back gate voltage VBML is obtained by delaying the first gate signal GW by the ½ frame, the variation of the gate voltage may be reduced by half $$\text{(e.g., } \Delta V_g/2 \cong \frac{I_{off} \times \Delta t/2}{C_{st}}\text{).}$$

When the variation of the gate voltage is reduced by half, the variation of the driving current IOLED flowing through the first transistor T1 may be reduced $$\text{(e.g., } \Delta I_{DS} \cong I_O \cdot \exp\left(\frac{\Delta V_g/2 - V_{th}}{mKT}\right)\text{).}$$

As described above, In an embodiment of the organic light emitting diode display device according to the invention, the variation of the driving current IOLED flowing through the first transistor T1 inside the pixel may be reduced, thereby effectively preventing the flicker phenomenon.

Figure 7:
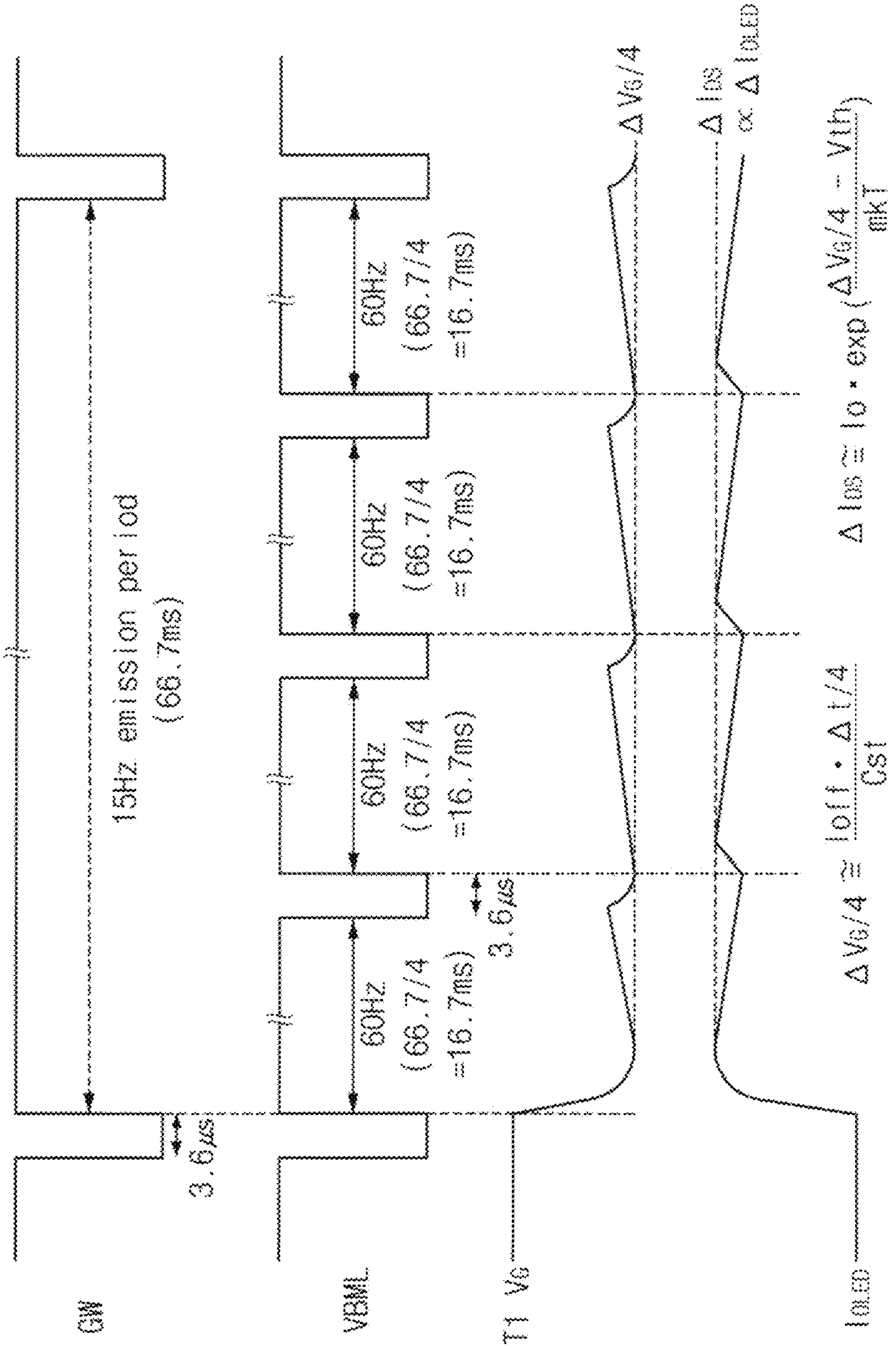
FIG. 7 is a timing diagram illustrating an alternative embodiment of a back gate voltage applied to the pixel of FIG. 2.

FIG. 7 is a timing diagram illustrating an alternative embodiment of a back gate voltage VBML applied to the pixel of FIG. 2.

Referring to FIG. 7, an embodiment of the pixel of the organic light emitting diode display device according to the invention may include the first transistor T1 including the gate electrode connected to the gate node and the back gate electrode BML connected to the back gate line BL, as shown in FIG. 2. In an embodiment, during ultra-low-frequency driving, the first transistor T1 may include the back gate electrode BML under the gate electrode to compensate for the distortion of the voltage of the gate node caused by the leakage currents of the first sub-transistor T3-1 and the third sub-transistor T4-1. In such an embodiment, in an ultra-low-frequency driving mode, the first transistor T1 may be controlled in a way such that a frequency of the back gate voltage VBML is increased as a frequency of the first gate signal GW decreases.

In an embodiment, the organic light emitting diode display device may operate in the ultra-low-frequency driving mode. The ultra-low-frequency driving mode may be a mode in which a driving signal of the organic light emitting diode display device is driven at a frequency of 15 Hz or less. In one embodiment, for example, the first gate signal GW may be driven at 15 Hz as shown in FIG. 7, but a frequency of the ultra-low-frequency driving mode is not limited thereto. When the frequency of the back gate voltage VBML is controlled to be increased as the frequency of the first gate signal GW decreases, as the back gate voltage VBML is applied, the variation of the gate voltage may be minimized in the emission period of the pixel of the organic light emitting diode display device. In one embodiment, for example, where the first gate signal GW of the organic light emitting diode display device is driven at 15 Hz, the frequency of the back gate voltage VBML may be 60 Hz. In such an embodiment, the back gate voltage VBML may be applied four times in the emission period of the pixel of the organic light emitting diode display device.

In such an embodiment, the variation of the gate voltage applied to the first transistor T1 may be calculated by Formula:

$$\Delta V_g \cong \frac{I_{off} \times \Delta t}{C_{st}}.$$

In the Formula, $I_{off}$ may denote an off-current flowing through T3 and T4 (IOFF in FIG. 2). In addition, a variation of the driving current IOLED flowing through the first transistor T1 may be calculated by Formula:

$$\Delta I_{DS} \cong I_O \cdot \exp\left(\frac{\Delta V_g - V_{th}}{mKT}\right).$$

In the Formula, $I_o$ may denote a reference off-current according to a characteristic of the pixel. In addition, $V_{th}$ may denote the threshold voltage of the first transistor. Further, m may denote a proportionality constant representing a characteristic of the first transistor, K may denote a Boltzmann constant, and T may denote a temperature proportionality constant. In such an embodiment, the variation of the gate voltage applied to the first transistor T1 may be reduced by the back gate voltage VBML. Accordingly, in an embodiment where the frequency of the back gate voltage VBML is controlled to be increased as the frequency of the first gate signal GW decreases, the variation of the gate voltage may be reduced by several times (e.g., reduced by four times). When the variation of the gate voltage is reduced by several times (e.g., $$\Delta V_g/4 \cong \frac{I_{off} \times \Delta t/4}{C_{st}}),$$

the variation of the driving current IOLED flowing through the first transistor T1 included in the organic light emitting diode display device may be reduced $$(\text{e.g., } \Delta I_{DS} \cong I_O \cdot \exp\left(\frac{\Delta V_g/4 - V_{th}}{mKT}\right)).$$

As described above, in an embodiment of the organic light emitting diode display device according to the invention, the variation of the driving current IOLED flowing through the first transistor T1 inside the pixel may be reduced, thereby effectively preventing the flicker phenomenon.

Figure 8:
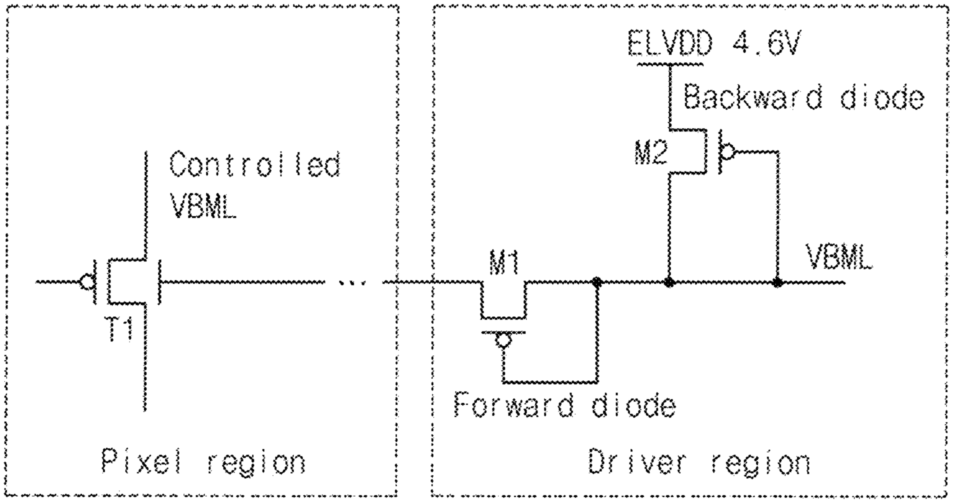
FIG. 8 is a diagram illustrating a circuit for adjusting a swing width of the back gate voltage.
Figure 9:
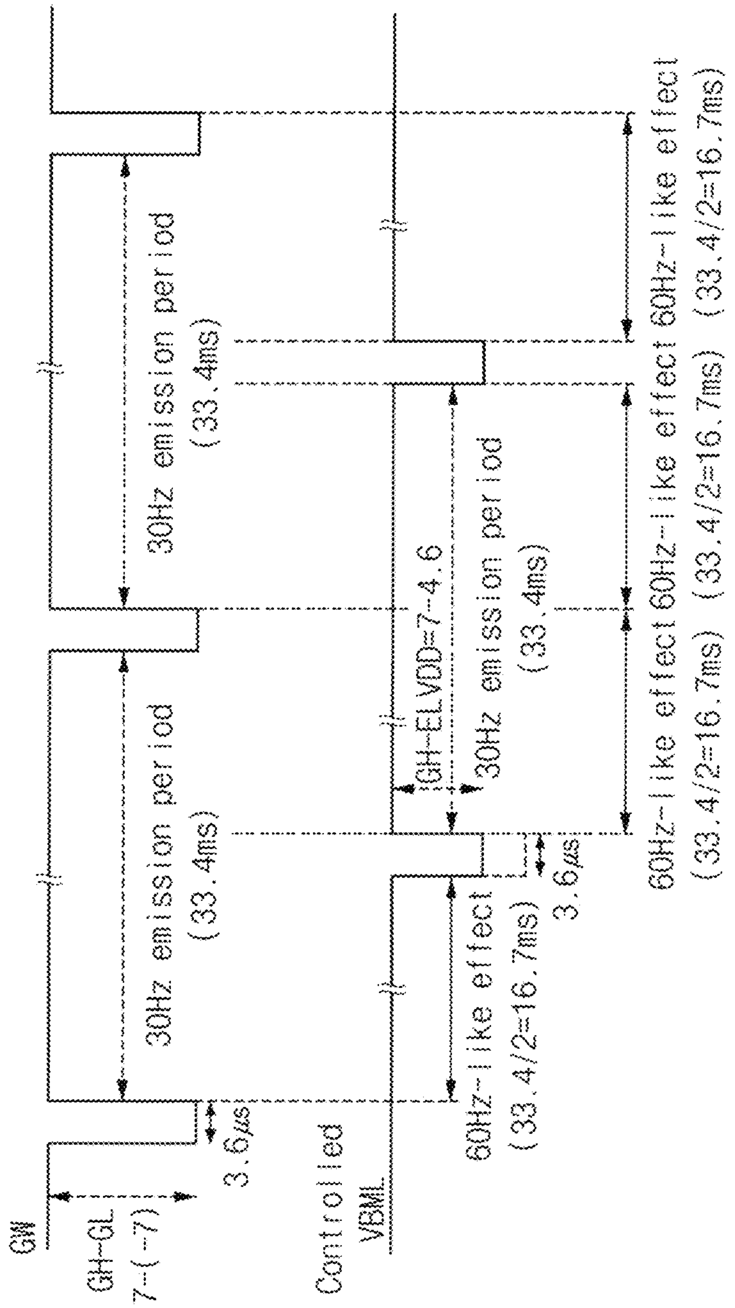
FIG. 9 is a timing diagram illustrating an embodiment in which the swing width of the back gate voltage is adjusted by the circuit of FIG. 8.

FIG. 8 is a diagram illustrating a circuit for adjusting a swing width of the back gate voltage VBML, and FIG. 9 is a timing diagram illustrating an embodiment in which the swing width of the back gate voltage VBML is adjusted by the circuit of FIG. 8.

Referring to FIGS. 8 and 9, an embodiment of the pixel of the organic light emitting diode display device according to the invention may include the first transistor T1 including the gate electrode connected to the gate node and the back gate electrode BML connected to the back gate line BL as shown in FIG. 2. In an embodiment, during the low-frequency driving, the first transistor T1 may include the back gate electrode BML under the gate electrode to compensate for the distortion of the voltage of the gate node caused by the leakage currents of the first sub-transistor T3-1 and the third sub-transistor T4-1. The back gate driver 700 (shown in FIG. 1) may apply the back gate voltage VBML to the back gate electrode BML through the back gate line BL. In such an embodiment, a swing width of the back gate voltage VBML may be adjustable.

In an embodiment, the back gate driver 700 may include a back gate voltage controller which adjusts a swing width of the back gate voltage VBML. The back gate voltage controller may include a backward diode M2 including a gate electrode which receives the back gate voltage VBML and a source to which the first power supply voltage ELVDD is applied. The back gate voltage controller may include a forward diode M1 connected to the back gate line BL. The back gate voltage controller may adjust the swing width of the back gate voltage VBML by using the backward diode M2 and the forward diode M1. As shown in FIG. 9, a general swing width of the back gate voltage VBML may be a value obtained by subtracting a gate low voltage GL from a gate high voltage GH (i.e., GH-GL in FIG. 9). In some cases, it may be desired to change the swing width of the back gate voltage VBML. In one embodiment, for example, the back gate voltage controller may adjust the swing width of the back gate voltage VBML to a value obtained by subtracting the first power supply voltage ELVDD from the gate high voltage GH by using the backward diode M2 and the forward diode M1. When the swing width of the back gate voltage VBML is adjusted as described above, in the low-frequency driving mode and the ultra-low-frequency driving mode, the pixel of the organic light emitting diode display device may minimize the variation of the gate voltage to reduce the variation of the driving current (IOLED in FIG. 2) flowing through the first transistor T1, such that the flicker phenomenon may be effectively prevented.

Figure 10:
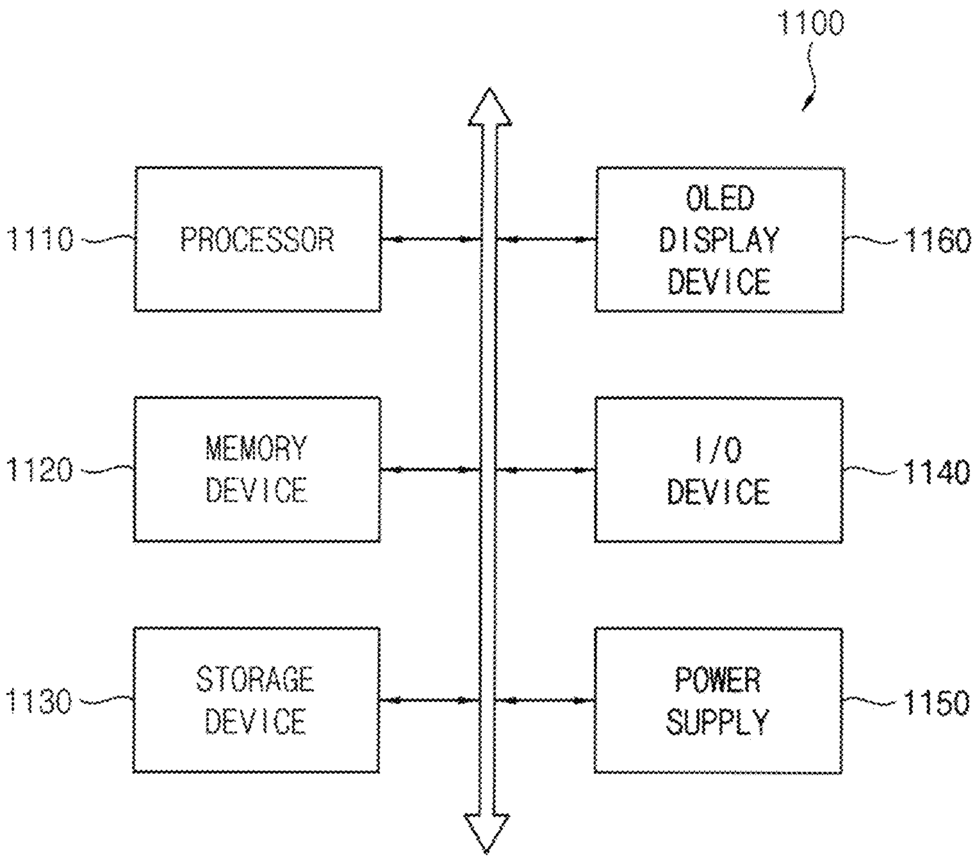
FIG. 10 is a block diagram illustrating an electronic device including an organic light emitting diode display device according to an embodiment of the invention.

FIG. 10 is a block diagram illustrating an electronic device including an organic light emitting diode display device according to an embodiment of the invention.

Referring to FIG. 10, an embodiment of an electronic device 1100 may include a processor 1110, a memory device 1120, a storage device 1130, an input/output ("I/O") device 1140, a power supply 1150 and an organic light emitting diode display device 1160. The electronic device 1100 may further include a plurality of ports for communicating a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. In an embodiment, the processor 1110 may be further coupled to an extended bus such as a peripheral component interconnection ("PCI") bus.

The memory device 1120 may store data for operations of the electronic device 1100. In one embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The organic light emitting diode display device 1160 may be coupled to other components through the buses or other communication links.

In each pixel of the organic light emitting diode display device 1160, a first transistor may include a gate electrode connected to the gate node, and a back gate electrode connected to a back gate line to receive a back gate voltage, which is obtained by delaying the first gate signal by a ½ frame, through the back gate electrode in a low-frequency driving mode. Accordingly, distortion of a voltage of the gate node during the low-frequency driving may be compensated, and display quality of the organic light emitting diode display device 1160 may be improved.

Embodiments of the invention may be applied to any organic light emitting diode display device 1160, and any electronic device 1100 including the organic light emitting diode display device 1160, for example, a mobile phone, a smart phone, a wearable electronic device, a tablet computer, a television ("TV"), a digital TV, a three-dimensional ("3D") TV, a personal computer ("PC"), a home appliance, a laptop computer, a personal digital assistant ("PDA"), a portable multimedia player ("PMP"), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel of an organic light emitting diode display device, the pixel comprising:

a first capacitor including a first electrode connected to a wire of a first power supply voltage, and a second electrode connected to a gate node;

a first transistor including a gate electrode connected to the gate node, and a back gate electrode connected to a back gate line through which a back gate voltage is provided;

a second transistor which transmits a data signal to a source of the first transistor in response to a first gate signal;

a third transistor which diode-connects the first transistor in response to the first gate signal;

a fourth transistor which transmits an initialization voltage to the gate node in response to a second gate signal; and a light emitting diode including an anode, and a cathode connected to a wire of a second power supply voltage, wherein the first transistor is a driving transistor of the pixel that generates a driving current flowing through the light emitting diode based on the data signal stored in the first capacitor, wherein the first transistor receives the back gate voltage, which is obtained by delaying the first gate signal by a ½ frame, through the back gate electrode in a low-frequency driving mode, such that distortion of a voltage of the gate node caused by leakage currents of the third and fourth transistors during the low-frequency driving mode is compensated, and wherein the gate electrode of the first transistor is not connected to the back gate electrode of the first transistor.

2. The pixel of claim 1, wherein the back gate electrode is disposed under the gate electrode of the first transistor.

3. The pixel of claim 2, wherein a swing width of the back gate voltage is adjustable.

4. The pixel of claim 2, wherein the third transistor includes first and second sub-transistors connected to each other in series between the gate node and a drain of the first transistor.

5. The pixel of claim 2, wherein the fourth transistor includes third and fourth sub-transistors connected to each other in series between the gate node and a wire of the initialization voltage.

6. The pixel of claim 2, further comprising:

a fifth transistor including a gate electrode which receives an emission signal, a source connected to the wire of the first power supply voltage, and a drain connected to the source of the first transistor;

a sixth transistor including a gate electrode which receives the emission signal, a source connected to a drain of the first transistor, and a drain connected to the anode of the organic light emitting diode; and a seventh transistor including a gate electrode which receives a third gate signal, a source connected to the anode of the organic light emitting diode, and a drain connected to a wire of the initialization voltage.

7. A pixel of an organic light emitting diode display device, the pixel comprising:

a first capacitor including a first electrode connected to a wire of a first power supply voltage, and a second electrode connected to a gate node;

a first transistor including a gate electrode connected to the gate node, and a back gate electrode connected to a back gate line through which a back gate voltage is provided;

a second transistor which transmits a data signal to a source of the first transistor in response to a first gate signal;

a third transistor which diode-connects the first transistor in response to the first gate signal;

a fourth transistor which transmits an initialization voltage to the gate node in response to a second gate signal; and a light emitting diode including an anode, and a cathode connected to a wire of a second power supply voltage, wherein the first transistor is a driving transistor of the pixel that generates a driving current flowing through the light emitting diode based on the data signal stored in the first capacitor, wherein the first transistor receives the back gate voltage through the back gate electrode, wherein the back gate voltage is controlled in a way such that a frequency of the back gate voltage is increased as a frequency of the first gate signal decreases in an ultra-low-frequency driving mode, such that distortion of a voltage of the gate node caused by leakage currents of the third and fourth transistors during the ultra-low-frequency driving mode is compensated, and wherein the gate electrode of the first transistor is not connected to the back gate electrode of the first transistor.

8. The pixel of claim 7, wherein the back gate electrode is disposed under the gate electrode of the first transistor.

9. The pixel of claim 8, wherein a swing width of the back gate voltage is adjustable.

10. The pixel of claim 8, wherein the third transistor includes first and second sub-transistors connected to each other in series between the gate node and a drain of the first transistor.

11. The pixel of claim 8, wherein the fourth transistor includes third and fourth sub-transistors connected to each other in series between the gate node and a wire of the initialization voltage.

12. The pixel of claim 8, further comprising:

a fifth transistor including a gate electrode which receives an emission signal, a source connected to the wire of the first power supply voltage, and a drain connected to the source of the first transistor;

a sixth transistor including a gate electrode which receives the emission signal, a source connected to a drain of the first transistor, and a drain connected to the anode of the organic light emitting diode; and a seventh transistor including a gate electrode which receives a third gate signal, a source connected to the anode of the organic light emitting diode, and a drain connected to a wire of the initialization voltage.

13. An organic light emitting diode display device comprising:

a display panel including a plurality of pixels;

a data driver which provides a data signal to the pixels;

a gate driver which provides a gate signal to the pixels;

a back gate driver which provides a back gate voltage to the pixels; and a driving controller which controls the data driver, the gate driver, and the back gate driver, wherein each of the pixels includes:

a first capacitor including a first electrode connected to a wire of a first power supply voltage, and a second electrode connected to a gate node;

a first transistor including a gate electrode connected to the gate node, and a back gate electrode connected to a back gate line through which a back gate voltage is provided;

a second transistor which transmits a data signal to a source of the first transistor in response to a first gate signal;

a third transistor which diode-connects the first transistor in response to the first gate signal;

a fourth transistor which transmits an initialization voltage to the gate node in response to a second gate signal; and a light emitting diode including an anode, and a cathode connected to a wire of a second power supply voltage, wherein the first transistor is a driving transistor of the pixel that generates a driving current flowing through the light emitting diode based on the data signal stored in the first capacitor, wherein the first transistor receives the back gate voltage through the back gate electrode, wherein the back gate electrode is disposed under the gate electrode of the first transistor, wherein the back gate voltage is obtained by delaying the first gate signal by a ½ frame in a low-frequency driving mode, such that distortion of a voltage of the gate node caused by leakage currents of the third and fourth transistors during the low-frequency driving mode is compensated, and wherein the gate electrode of the first transistor is not connected to the back gate electrode of the first transistor.

14. The organic light emitting diode display device of claim 13, wherein the back gate driver includes a back gate voltage controller which adjusts a swing width of the back gate voltage.

15. The organic light emitting diode display device of claim 14, wherein the back gate voltage controller includes:

a backward diode including a gate electrode which receives the back gate voltage, and a source to which the first power supply voltage is applied; and a forward diode connected to the back gate line.

16. The organic light emitting diode display device of claim 13, wherein the third transistor includes first and second sub-transistors connected to each other in series between the gate node and a drain of the first transistor.

17. The organic light emitting diode display device of claim 13, wherein the fourth transistor includes third and fourth sub-transistors connected to each other in series between the gate node and a wire of the initialization voltage.

18. The organic light emitting diode display device of claim 13, each of the pixels may further include:

a fifth transistor including a gate electrode which receives an emission signal, a source connected to the wire of the first power supply voltage, and a drain connected to the source of the first transistor;

a sixth transistor including a gate electrode which receives the emission signal, a source connected to a drain of the first transistor, and a drain connected to the anode of the organic light emitting diode; and a seventh transistor including a gate electrode which receives a third gate signal, a source connected to the anode of the organic light emitting diode, and a drain connected to a wire of the initialization voltage.

19. An organic light emitting diode display device comprising:

a display panel including a plurality of pixels;

a data driver which provides a data signal to the pixels;

a gate driver which provides a gate signal to the pixels;

a back gate driver which provides a back gate voltage to the pixels; and a driving controller which controls the data driver, the gate driver, and the back gate driver, wherein each of the pixels includes:

a first capacitor including a first electrode connected to a wire of a first power supply voltage, and a second electrode connected to a gate node;

a first transistor including a gate electrode connected to the gate node, and a back gate electrode connected to a back gate line through which a back gate voltage is provided;

a second transistor which transmits a data signal to a source of the first transistor in response to a first gate signal;

a third transistor which diode-connects the first transistor in response to the first gate signal;

a fourth transistor which transmits an initialization voltage to the gate node in response to a second gate signal; and a light emitting diode including an anode, and a cathode connected to a wire of a second power supply voltage, wherein the first transistor is a driving transistor of the pixel that generates a driving current flowing through the light emitting diode based on the data signal stored in the first capacitor, wherein the first transistor receives the back gate voltage through the back gate electrode, wherein the back gate electrode is disposed under the gate electrode of the first transistor, wherein the back gate voltage is controlled in a way such that a frequency of the back gate voltage is increased as a frequency of the first gate signal decreases in an ultra-low-frequency driving mode, such that distortion of a voltage of the gate node caused by leakage currents of the third and fourth transistors during the ultra-low-frequency driving mode is compensated, and wherein the gate electrode of the first transistor is not connected to the back gate electrode of the first transistor.

* * * * *